(12) United States Patent
Boyle

(10) Patent No.: US 6,483,469 B2
(45) Date of Patent: Nov. 19, 2002

(54) PORTABLE DEVICE ANTENNA

(75) Inventor: Kevin R. Boyle, Horsham (GB)

(73) Assignee: Koninklijke Philips Corporation N.V., Eindhoven (NL)

( * ) Notice: Subject to any disclaimer, the term of this patent is extended or adjusted under 35 U.S.C. 154(b) by 0 days.

(21) Appl. No.: 09/773,158

(22) Filed: Jan. 31, 2001

(65) Prior Publication Data

US 2001/0050645 A1 Dec. 13, 2001

(30) Foreign Application Priority Data

Feb. 10, 2000 (GB) .............................................. 0002935

(51) Int. Cl.⁷ ................................................. H01Q 1/12
(52) U.S. Cl. ...................................... 343/718; 343/897
(58) Field of Search ................................. 343/702, 793, 343/810, 897, 718; 29/600, 601; 342/357.06, 357.07, 357.09; H01Q 1/12

(56) References Cited

U.S. PATENT DOCUMENTS

| | | | | |
|---|---|---|---|---|
| 4,584,707 A | | 4/1986 | Goldberg et al. ............. 455/41 |
| 5,148,002 A | * | 9/1992 | Kuo et al. ................... 219/211 |
| 5,416,310 A | * | 5/1995 | Little .......................... 235/462 |
| 5,749,365 A | * | 5/1998 | Magill ........................ 128/671 |
| 5,771,027 A | | 6/1998 | Mark et al. ................. 343/912 |
| 5,825,327 A | | 10/1998 | Krasner ....................... 342/357 |
| 6,259,399 B1 | * | 7/2001 | Krasner ................. 342/357.06 |
| 6,330,479 B1 | * | 12/2001 | Stauffer ....................... 607/101 |

FOREIGN PATENT DOCUMENTS

| | | | | |
|---|---|---|---|---|
| DE | 19813704 A | | 9/1999 | ............ H01Q/1/22 |
| EP | 0637094 A1 | | 2/1995 | ............ H01Q/9/04 |
| GB | 2183099 A | | 5/1987 | ............ H01Q/1/22 |

* cited by examiner

Primary Examiner—Don Wong
Assistant Examiner—Trinh Vo Dinh
(74) Attorney, Agent, or Firm—Gregory L. Thorne

(57) ABSTRACT

A garment 10, such as a pair of trousers, skirt or full-length coat, comprises an antenna 12 and means 14 for connection of the same to a portable electronic device 16 to permit wireless communications of said device 16 via the antenna 12. The antenna 12 is a longitudinal conductive element attached to the garment 10 in such an orientation as to be close to the ground and to extend substantially vertically when a wearer of the garment is in a standing position. The antenna orientation close to the natural ground plane gives improved reception for, e.g. FM radio broadcasts.

14 Claims, 5 Drawing Sheets

PORTABLE DEVICE ANTENNA

FIELD OF THE INVENTION

The present invention relates to portable electronic devices and to antenna arrangements to enable wireless transfer of data to and/or from such devices and, in particular, to such an antenna arrangement attached to or incorporated into a pair of trousers or other garment.

BACKGROUND OF THE INVENTION

It is known to provide an antenna in or attached to a garment, for example for use in a mobile telecommunications system. One example of this is given in EP-A-0 637 094 to Matsushita which describes an antenna comprising metal antenna elements in the form of conductive plates formed on opposite sides of a dielectric slab; the antenna is intended for mounting on a human shoulder, and the rigidity of the dielectric slab prevents deformation of the antenna. However, the rigidity also results in the antenna being uncomfortable and inconvenient to wear, as well as rendering it somewhat obtrusive. A more flexible construction of wearable antenna for such applications is described in our commonly assigned United Kingdom patent application no.9927842.6 (PHB34417) whilst the flexible construction makes the antenna more suited for incorporation into garments for everyday wear, the need for insulator spacing of plates creates a certain thickness for the antenna which limits its applications.

It is also known to provide an antenna suitable for at least partial incorporation into a garment from U.S. Pat. No. 5,825,327 (Krasner) which describes an arrangement of GPS receiver and GPS transmitter, communication antenna and communication transmitter incorporated into a jacket and/or a pair of trousers with the antennae being in the form of flexible strip antenna devices sewn to the inner or outer surface of the garment. The particular consideration of Krasner is the avoidance of line-of-sight problems which can affect the acquisition and tracking of GPS satellite signals.

A further example of an antenna incorporated within a garment is given in United Kingdom patent application GB-A-2 183099 (UK Secretary of State for Defense). The antenna described comprises a tubular member of flexible electrically-conducting material fitted as a liner within the sleeve of a jacket (or other upper body garment) or within the leg of a pair of trousers.

What is not considered is how the performance of the antennae in GB-A-2 183099 and U.S. Pat. No. 5,825,327 (Krasner), and other wearable antenna constructions, might be improved and/or adapted for optimum performance.

Accordingly, it is an object of the present invention is to provide an antenna capable of unobtrusive incorporation into a garment and having improved performance.

SUMMARY OF THE INVENTION

In accordance with the present invention there is provided a garment comprising an antenna and means for connection of the same to a portable electronic device to permit wireless communications of said device via said antenna;

wherein the garment is shaped to be worn about the lower body of a user and the antenna is a longitudinal conductive element attached to the garment in such an orientation as to be close to the ground and to extend substantially vertically when a wearer of the garment is in a standing position.

As will be described in greater detail hereinafter with reference to FIGS. 1 to 3 of the accompanying drawings, the applicants have recognised that, by arraying the elements of an antenna in vertical orientation but close to the ground (for example in a dress, skirt, pair of trousers or full length coat), the effect of a flat earth plane—i.e. the ground—may be utilised to give enhanced performance.

The antenna might be a single conductor or may comprise a plurality of longitudinal conductive elements spaced about the lower portion of the garment and positioned in substantially parallel alignment. Such an arrangement also counters the electric field reduction effect of the human body, as will also be described in greater detail hereinafter.

The or each antenna element may be attached to an interior surface of the garment, or attached to an exterior surface of the garment, or be concealed within a seam of the garment, or a combination of some or all of these arrangements may be utilised. Alternatively, the or each antenna element may comprise a track of flexible conductive material deposited on a surface of the garment, or may comprise one or a plurality of conductive threads interwoven with the material of the garment. Indeed, substantive portions of the garment may be woven from conductive thread or otherwise assembled from conductive material such as to provide a large area for the antenna element.

The or each antenna may comprise a monopole element with a feed connection at the upper end thereof, or it may comprise a dipole with a feed connection joining a matched pair of antenna elements. This latter arrangement is particularly suited where the garment is in the form of a pair of trousers with each of said matched pair of elements being disposed down a respective leg of the trousers, although it will be recognised that such symmetry is not mandatory.

The said means for connection to the portable electronic device may comprise a conventional plug and socket or might comprise one or more conductive press stud connectors in electrical contact with the or each antenna element. For enhanced usability, the garment may further comprise a pocket for reception of the said portable electronic device adjacent said antenna.

As will be described, the form of electronic device may vary, with the wireless link capability allowing devices previously required to be of unitary (i.e. hard-wired) construction to instead take up a distributed arrangement with separate components spread amongst the garments of a user (or possibly even of several users). By use of the invention as the antenna in mobile telecommunications equipment, the remainder of the handset can be made smaller and lighter than was previously possible through separation of the component parts, particularly as the overall size of many mobile telephone handsets is constrained by the size of the antenna assembly used. Such an antenna is intended to be flexible and lightweight and one that does not impede the movements of the user. The mobile telecommunications equipment may be a mobile telephone or a pager or other portable devices accessing a single base-station or forming a part of a wireless Local Area Network (LAN).

BRIEF DESCRIPTION OF THE DRAWINGS

The invention will now be described by way of example with reference to the accompanying drawings in which.

DETAILED DESCRIPTION OF THE INVENTION

Figure 1:
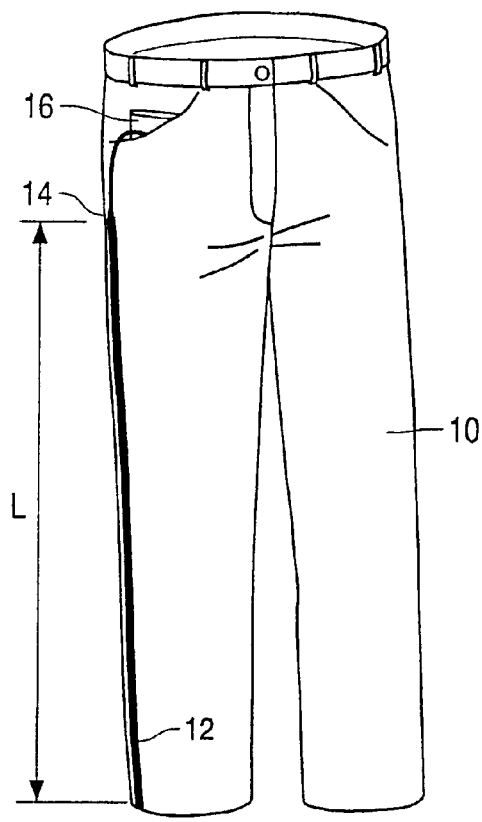
FIG. 1 illustrates a first embodiment of garment embodying the present invention, with a single monopole antenna.

FIG. 1 illustrates the basic features of the present invention, in which a garment, in this example a pair of trousers, leggings, slacks, jogging pants or the like 10, comprises an antenna 12 and means 14 for connection of the same to a portable electronic device 16 to permit wireless communications of said device 16 via the antenna 12. The antenna 12 is a longitudinal conductive element attached to the garment 10 in such an orientation as to be close to the ground and to extend substantially vertically when a wearer of the garment is in a standing position.

This particular arrangement for the antenna relative to the garment has been identified by the present applicants as one providing particular benefits in terms of performance, especially but not exclusively for the reception of broadcast FM radio signals. The antenna arrangement of the present invention makes particular use of the effects of reflected rays when operating close to a flat earth plane—typically the ground itself in the case of the garment 10.

Figure 2:
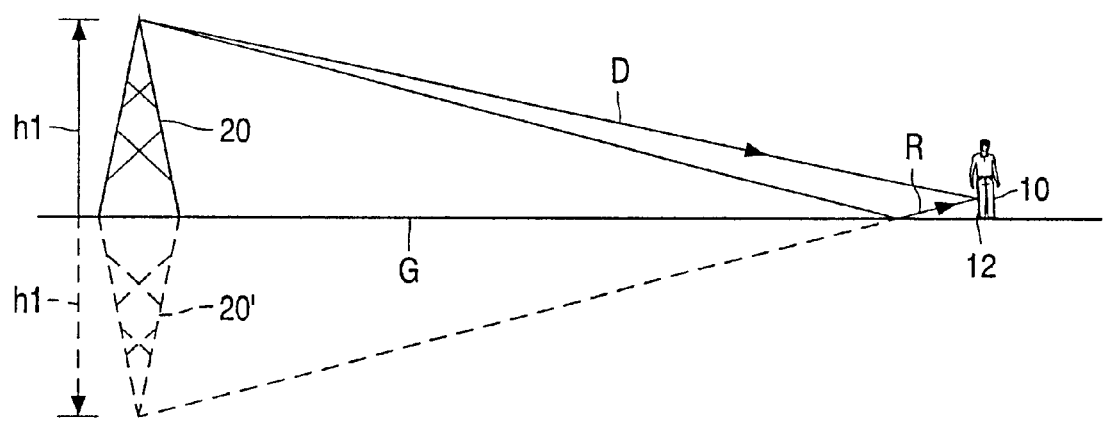
FIG. 2 illustrates the effect of direct and reflected signals on antennae close to ground planes.

The field received above ground G will be the vector addition of the direct D and reflected R waves from the transmitting antenna 20 to receiving antenna 12, as shown in FIG. 2. The reflected wave R can accounted for by the introduction of an equivalent image 20' beneath the ground G.

Figure 3:
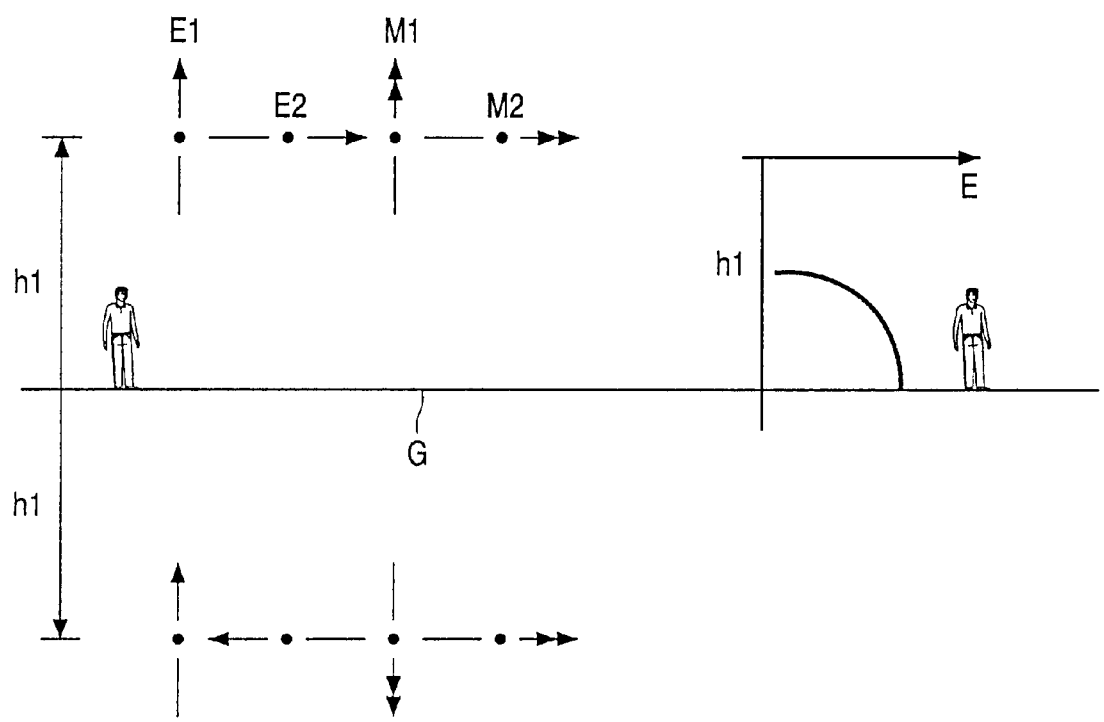
FIG. 3 schematically represents the accumulation and depreciation of magnetic and electrical field components close to ground level in the example of FIG. 2.

The orientation of the image can be found by consideration of the reflection coefficient of the field component. This varies with angle, but above the Brewster angle (which is low for most ground conditions compared to the angles at which scattered waves arrive), it can be considered constant in sign. It is positive for the vertically polarised electric field E1 and horizontally polarised magnetic field M2. It is negative for the horizontally polarised electric field E2 and vertically polarised magnetic field M1. This gives the images shown in FIG. 3. When the images are positive (i.e. same direction as for E1 and M2) the direct and reflected waves add in phase near the ground G, giving a field enhancement: this is illustrated by the graph to the right of FIG. 3 showing the variation in field strength E at varying distances h from the supposedly infinite and perfect conductor of the ground plane G. When negative (i.e. opposite direction), the direct and reflected waves add in anti-phase near the ground, giving a field degradation.

By its positioning within a garment and generally vertically oriented (for when the user is standing or walking about), the antenna in the garment according to the present invention receives the vertical electric field near the ground and therefore utilises the maximum field enhancement to give improved performance over, for example, the relatively short GPS satellite signal receiving antennae of the above-described Krasner reference.

Figure 4:
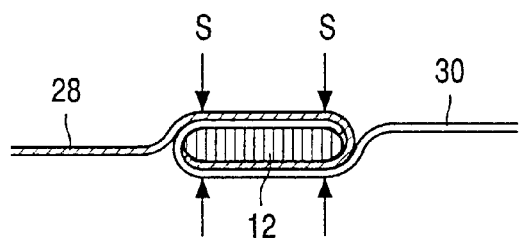
FIG. 4 represents an arrangement of garment seam incorporating and concealing an antenna.

Reverting to FIG. 1, and with additional reference to FIGS. 4 to 6, some further features of the garment will now be described. As shown in FIG. 1, the antenna 12 may be in the form of a strip of conductive woven material sewn or otherwise attached to the exterior surface of the garment in an arrangement that makes a feature of the antenna. A more discrete arrangement, possible where only a single monopole element is used, is to conceal the element within a seam of the garment, as illustrated in FIG. 4 which represents a section through the seam showing the first and second pieces of garment fabric 28, 30 joined in a seam concealing antenna element 12 and secured by stitching through where indicated by arrows S.

Figure 5:
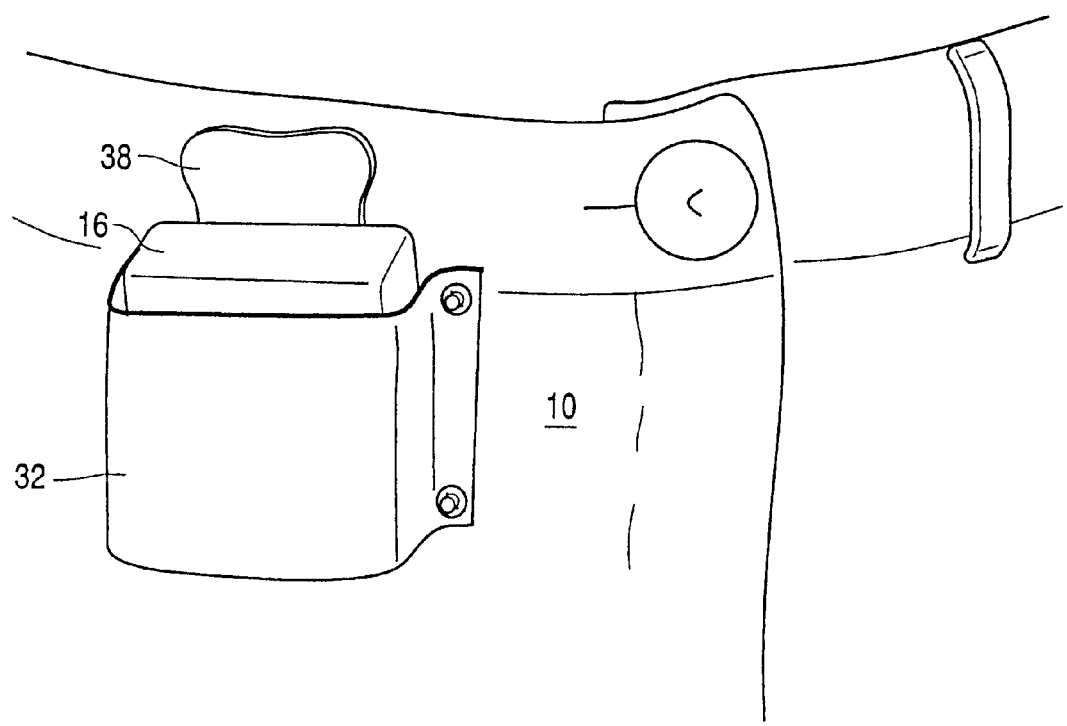
FIG. 5 represents the provision of a storage or receptacle means within the garment for the electronic device linked to the aerial.
Figure 6:
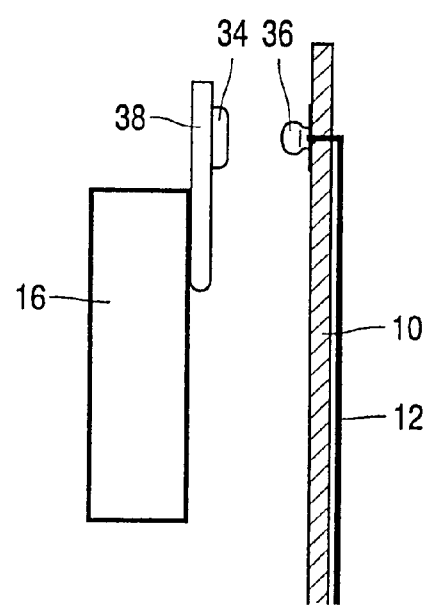
FIG. 6 is a side-view detail of the arrangement of FIG. 5 showing the connection mechanism between the electronic device and the antenna.

The portable electronic device 16 may be carried in a dedicated (i.e. specifically shaped and positioned) pocket 32 of the garment 10 as shown in FIG. 5. Connection of the device to the antenna may suitably be accomplished through sets of conductive press-studs 34, 36, as shown in FIG. 6, with the press studs of the device 16 being carried on a flexible patch 38 for ease of removal, although direct mounting of press-stud 34 on the exterior casing of device 16 is possible. The distribution and number of pressstud (or conventional plug and socket) electrical connectors will depend on the form and function of the device. For example, where the device does not carry its own power supply, a pair of connectors may provide a link via conductive track or cable within the garment to a power supply.

An optimum use for the antenna 12 is where the portable electronic device is an FM radio receiver, with the length L of the antenna element or elements being optimised for the centre frequency of the FM broadcast band. The wavelength at the centre frequency is approximately 3.0 metres, with a quarter wavelength antenna element 12 of length L=0.75 metres having not only optimum performance when operating close to the ground plane but also being of a length suitable for inclusion in a pair of trousers or other lower body garment.

Figure 7:
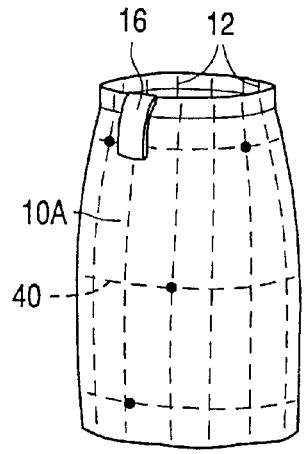
FIG. 7 illustrates a further embodiment of garment embodying the present invention, with an antenna of plural, mostly concealed, monopole antenna elements.
Figure 8:
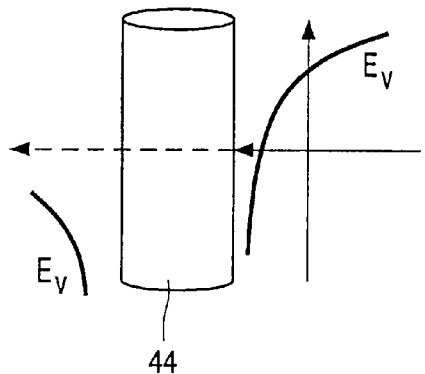
FIG. 8 schematically represents the effect of field reduction on incident electric fields close to a human body.

Further variations, both in the form of the garment and included antenna, will now be described with reference to FIGS. 7, 8 and 9. FIG. 7 represents a skirt having a number of antenna elements disposed in vertical (and substantially parallel) alignment as before, but on the interior surface of the garment 10A. The antenna elements may be separate strips of conductive fabric as before, or they may be formed from conductive threads woven into the cloth from which the garment 10A is fabricated. In a further alternative, the elements may be formed from a conductive compound which is simply painted or otherwise deposited on the material to form tracks or panels.

The antenna elements in FIG. 7 are coupled with a portable electronic device 16 clipped to the garment waistband through one or more feed connections 40 running perpendicular to the antenna elements 12. A particular benefit from having a number of antenna elements spread around the garment is that shadowing (caused by a part of the wearers body appearing between the signal source and antenna element) is largely avoided.

A further problem countered by having the elements spaced around the garment is that of the electric field reduction effect of the human body. This effect is illustrated in FIG. 8, with electric field strength $E_y$ being attenuated close to the body 44 as the field approaches from the right: the further attenuation of $E_y$ shown to the left of the body is that arising from shadowing. By distributing the antenna elements around the body 44, this drop-off in field strength is minimised, leading to improved performance of the antenna.

Figure 9:
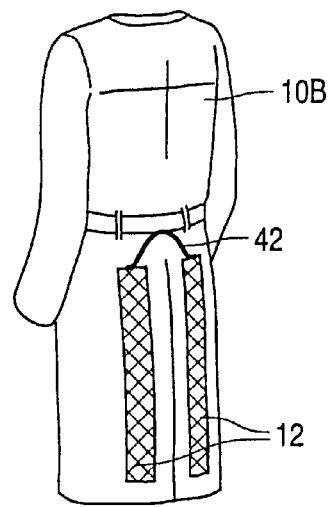
FIG. 9 illustrates a still further embodiment of garment embodying the present invention, with an antenna comprised of a pair of woven patches coupled as dipole antenna elements.
Figure 10:
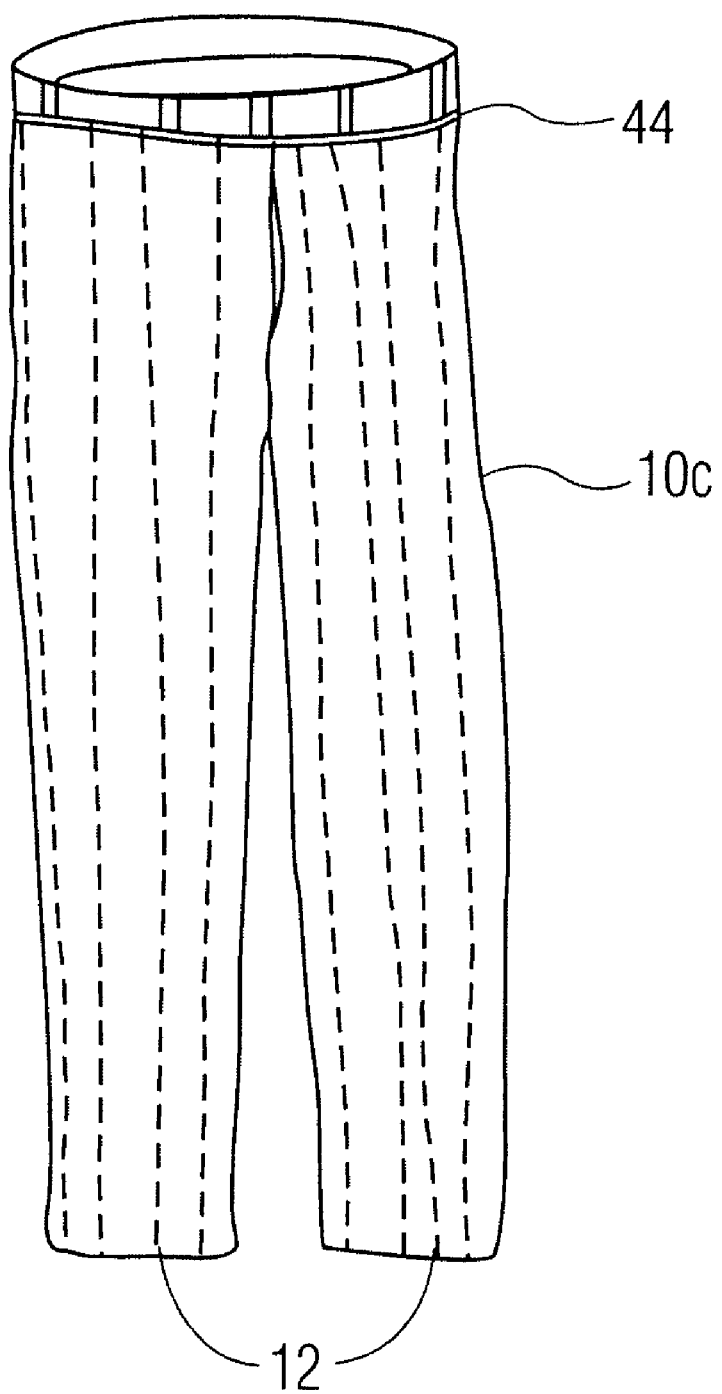
FIG. 10 illustrates a further embodiment of a garment embodying the present invention.

FIG. 9 represents a further garment 10B in the form of a full-length coat having a pair of antenna elements 12 formed from woven panels of conductive material. The two panels, again optimized in length for the particular signal type to be received and/or sent, are driven from a connection between them (illustrated generally at 42) as a dipole antenna. This arrangement may also be applied to the skirt of FIG. 7 or to a pair of trousers 10C of FIG. 10, with each leg being surrounded by antenna elements 12—giving the above described benefits in terms of reduced shadowing and field reduction—connected together with a feed connection 44 to form a respective half of the dipole antenna.

Whilst described in terms of an FM radio, the skilled reader will be aware of other uses for the present invention, where the portable electronic device 16 may comprise an AM radio, mobile telephone, pager, mobile radio, PDA with network capability and so forth, with the antenna 12 configured as necessary.

From reading the present disclosure, other modifications will be apparent to persons skilled in the art. Such modifications may involve other features which are already known in the design, manufacture and use of garments and antennas and applications thereof and which may be used instead of or in addition to features already described herein.

What is claimed is:

1. A garment comprising an antenna and means for connection of the same to a portable electronic device to permit wireless communications of said device via said antenna;

wherein the garment is shaped to be worn about the lower body of a user and the antenna is a longitudinal conductive element attached to the garment in such an orientation as to be close to the ground and to extend substantially to the bottom end of the garment and vertically when a wearer of the garment is in a standing position.

2. The garment as claimed in claim 1, wherein the antenna comprises a plurality of longitudinal conductive elements spaced about the lower portion of the garment and positioned in substantially parallel alignment.

3. The garment as claimed in claim 1, wherein the conductive element is attached to an interior surface of the garment.

4. The garment as claimed in claim 1, wherein the conductive element is attached to an exterior surface of the garment.

5. The garment as claimed in claim 1, wherein the conductive element comprises a track of flexible conductive material deposited on a surface of the garment.

6. The garment as claimed in claim 1, wherein the conductive element is concealed within a seam of the garment.

7. The garment as claimed in claim 1, wherein the conductive element comprises one or a plurality of conductive threads interwoven with the material of the garment.

8. The garment as claimed in claim 1, wherein the conductive element comprises a monopole element with a feed connection at the upper end thereof.

9. The garment as claimed in claim 1, wherein the conductive element comprises a dipole with a feed connection joining a matched pair of antenna elements.

10. The garment as claimed in claim 9, in the form of a pair of trousers with each of said matched pair of elements being disposed down a respective leg of the trousers.

11. The garment as claimed in claim 1, wherein said means for connection to said portable electronic device comprise one or more conductive press stud connectors in electrical contact with the conductive element.

12. The garment as claimed in claim 1, further comprising a pocket for reception of said portable electronic device adjacent said antenna.

13. The garment as claimed in claim 1, wherein the conductive element is approximately 0.75 metres in length.

14. The garment as claimed in claim 1, wherein the conductive element is of an optimal length for reception of a predetermined radio frequency.

* * * * *